United States Patent
English

(10) Patent No.: US 7,316,173 B2
(45) Date of Patent: Jan. 8, 2008

(54) TILT AWAY TAILSTOCK ATTACHMENT FOR LATHES

(76) Inventor: Brent W. English, 3376 Mounds View Rd., Barneveld, WI (US) 53507

( * ) Notice: Subject to any disclaimer, the term of this patent is extended or adjusted under 35 U.S.C. 154(b) by 0 days.

(21) Appl. No.: 11/442,545

(22) Filed: May 30, 2006

(65) Prior Publication Data

US 2006/0272459 A1    Dec. 7, 2006

Related U.S. Application Data

(60) Provisional application No. 60/686,823, filed on Jun. 3, 2005.

(51) Int. Cl.
    *B23B 23/00* (2006.01)
(52) U.S. Cl. .......................... 82/148; 82/152
(58) Field of Classification Search ............. 82/148, 82/152, 153, 154, 155, 156
    See application file for complete search history.

(56) References Cited

U.S. PATENT DOCUMENTS

| | | | |
|---|---|---|---|
| 1,498,821 A * | 6/1924 | Thompson | 29/46 |
| 1,973,409 A * | 9/1934 | Ole | 144/48.4 |
| 2,768,663 A * | 10/1956 | Jones | 144/1.1 |
| 3,109,319 A * | 11/1963 | Pierce | 477/19 |
| 3,127,814 A * | 4/1964 | Yermish | 409/240 |
| 3,587,368 A * | 6/1971 | Reiners | 82/124 |
| 5,186,087 A * | 2/1993 | McCormack | 82/142 |
| 6,178,856 B1 * | 1/2001 | Caddaye et al. | 82/117 |
| 6,796,012 B2 * | 9/2004 | Geissler et al. | 29/27 C |
| 7,011,002 B2 * | 3/2006 | Wirth et al. | 82/142 |

* cited by examiner

*Primary Examiner*—Willmon Fridie, Jr.

(57) ABSTRACT

Woodturners who make bowls frequently find that the unoccupied tailstock limits the path of the tool handle. The normal solution is to manually remove the tailstock from the lathe and set it on the floor or a work bench. Tailstocks can be heavy and manual removal and reinstallation might be needed several times during the production of a single piece. The invention provides a means to get the tailstock out of the turners way via a short bed extension that is pivotally mounted on the end of the lathe bed. To use it, the tail stock is slid back onto the extension, a hold down is released, and the tailstock is tilted away from the user. After tilting, a second set of ways lines up with the existing bed, allowing full use of the additional length afforded by the invention. The invention allows the tailstock to be easily returned to its normal position.

13 Claims, 5 Drawing Sheets

TILT AWAY TAILSTOCK ATTACHMENT FOR LATHES

BACKGROUND

Woodturning is a well known and readily accessible craft, practiced by many hobbyists and some professionals. For those turners that make bowls, hollow forms and vessels (as opposed to spindle work which always requires a tailstock), the desired shape being turned often results in the need for the gouge or chisel handle to pass through the space that is taken up by the unoccupied tailstock of the wood lathe. To remedy this situation, the tailstock is manually lifted from the bed of the lathe and placed on the floor or a nearby work bench. This can be awkward because the tailstock, especially on larger lathes, is heavy and hard to handle. Manually reinstalling the tailstock is even more problematic because the heavy and awkward tailstock must now be aligned with the lathe bed ways. The cumulative affect of all the manual tailstock removal and reinstallation is excess lathe wear, woodturner fatigue and opportunities for accidents.

Various lathes and lathe components have been patented over the years that have moveable components to increase the capacity and versatility of the lathe. None of them address the practical problem of effectively removing the unoccupied tailstock from the lathe so that the woodturner can freely access the work, nor has any solution been developed to allow the unoccupied tailstock to be quickly and easily brought back into position so that it might be used for other woodturning applications, such as spindle turning.

U.S. Pat. No. 1,319,645 teaches a mechanism whereby the entire lathe bed is rotated in a horizontal plane, the vertical axis of which is centered under the headstock. This design teaches a convenient means so that a jeweler might better access work using the lathe bed, but did not address unoccupied tailstock issues.

U.S. Pat. No. 4,068,547 is an adjustable tailstock for the tapering of work pieces, and provides a larger and more convenient means of exploiting its range of motion for increased accuracy and range of tapers that can be cut than conventional tailstocks, but its range of motion does not extend to getting out of the way when the tailstock itself if unoccupied.

U.S. Pat. No. 4,520,700 teaches a tailstock for supporting cylindrical work pieces in sub-micrometer precision coordinate measuring equipment that can rotate in a horizontal plane around a vertical axis so that work can be more easily loaded and unloaded in the measuring device. The mechanism also contains sophisticated adjustments for taking into consideration thermal expansion, which is not a factor in the coarser art of woodturning.

U.S. Pat. No. 5,5755,041 is a resiliently yieldable tailstock device which is adapted to clamp the workpiece with controlled thrust. Although this mechanism is novel, it again addresses only the work holding capacity of the tailstock.

U.S. Pat. No. 6,178,856 is for a very versatile lathe with a variety of moving and auxiliary components. One of the notable features of this lathe is that the entire lathe bed can be slid back and forth and rotated in an horizontal plane around a vertical axis. The tailstock is also fitted with a vertical axis so that it too can rotate in a horizontal plane to enable it to be realigned with the spindle once the bed is rotated. This design does not address the issue of getting an unoccupied tailstock out of the woodturners tool path, leaving manual removal and installation the only mechanism available.

The present invention seeks to overcome the deficiencies of the existing art and provide a safe, convenient means of removing the unoccupied tailstock from the turners tool handle path and provide an equally save and convenient means of returning it to its normal position when the turner has a need for it.

BRIEF SUMMARY OF THE INVENTION

The invention is a short lathe bed extension that has two sets of ways (primary and secondary) which rotate in a vertical plane about a horizontal axis. Either set of ways may line up with the ways of the existing lathe bed. A cam-type hold down device securely locks the pivoting bed extension anywhere in its arc of travel. A stop is provided so that either set of the inventions ways will line up with the existing lathe ways. To use the invention, the tail stock is slid onto the primary set of ways on the invention until the tailstock stop is reached. Then the hold down is released, and the tailstock is tilted away from the user until it pivots out of the way. The invention is then locked into place by the turner. The aforementioned secondary set of ways line up with the existing bed when the tailstock is tilted out of the way, allowing full use of the additional length afforded by the invention. The tailstock is easily returned to its upright and locked position by reversing the procedure.

DETAILED DESCRIPTION OF THE INVENTION

The invention as depicted is fabricated from various plates of steel cut to shape by laser, waterjet, plasma torch or similar means with the individual parts welded and bolted together. It is understood that these parts could also be made from cast components to reduce the overall part count of the assembly, but functionally would remain very much the same. Other components are made on a metal lathe or milling machine, either CNC or manual equipment being sufficient to machine the parts with suitable accuracy.

Figure 1:
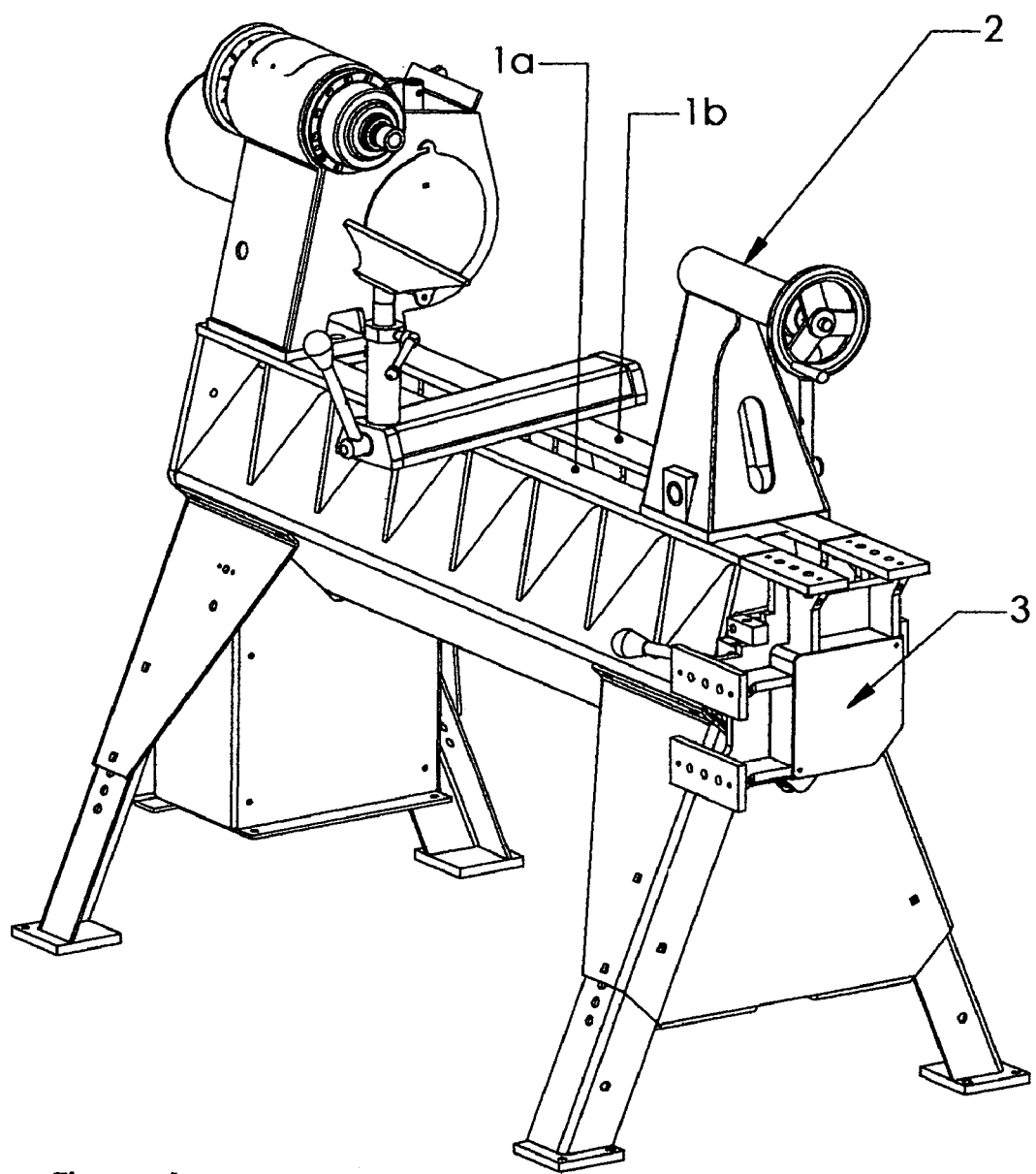
FIG. 1 shows a conventional woodturning lathe with the invention bolted to the tailstock end of the lathe bed.
Figure 2:
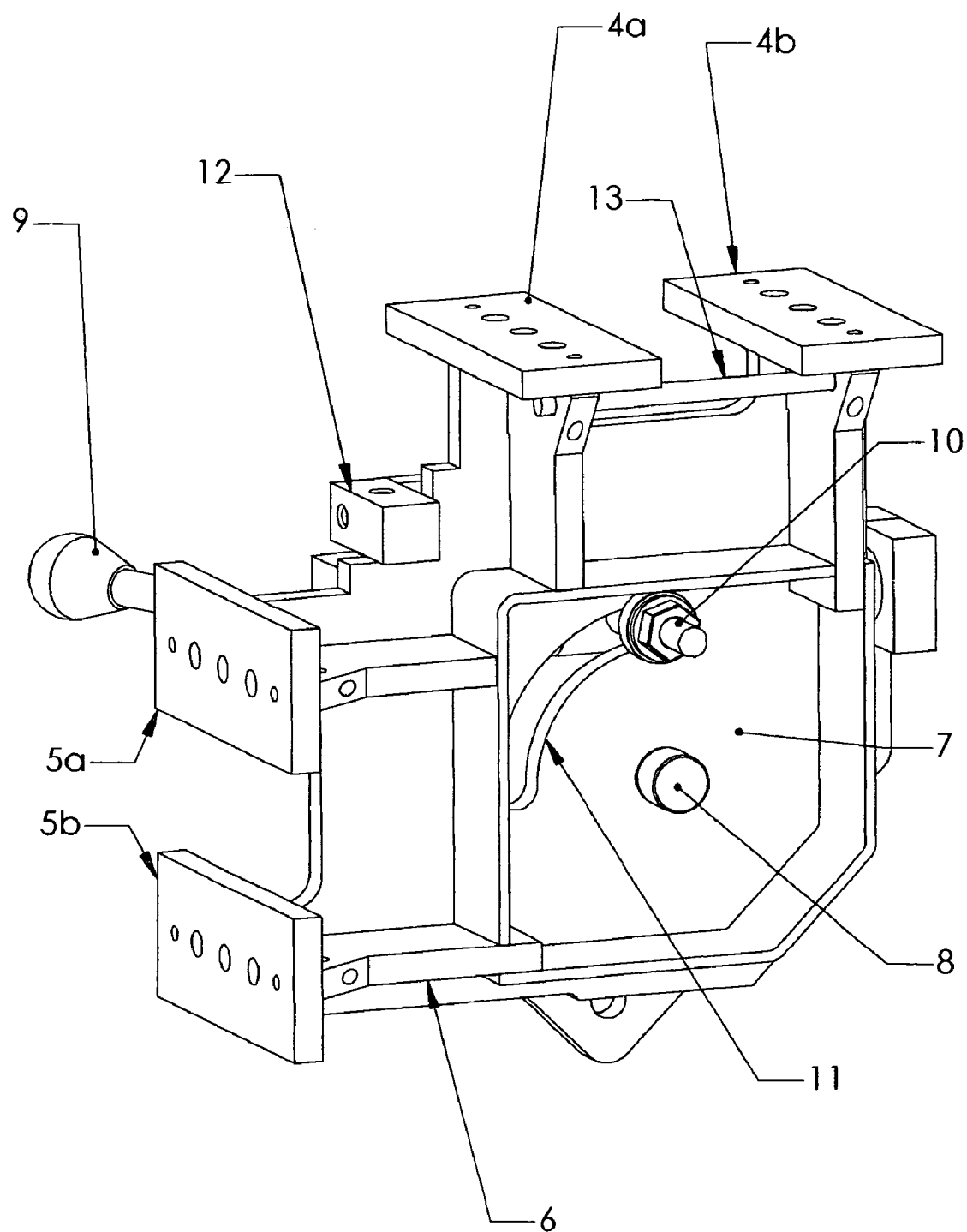
FIG. 2 shows the invention with the cover removed.
Figure 3:
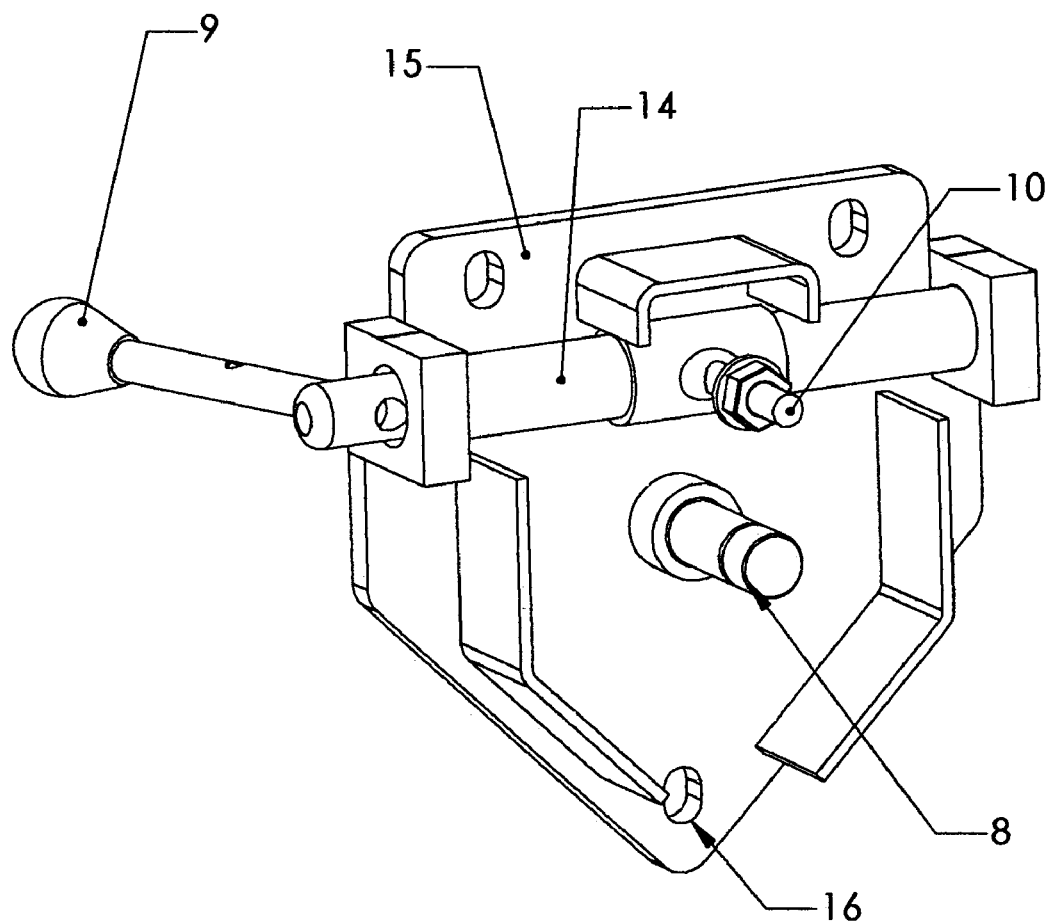
FIG. 3 shows the invention with the rotating component removed so that the locking mechanism and horizontal pivot can be examined.
Figure 4:
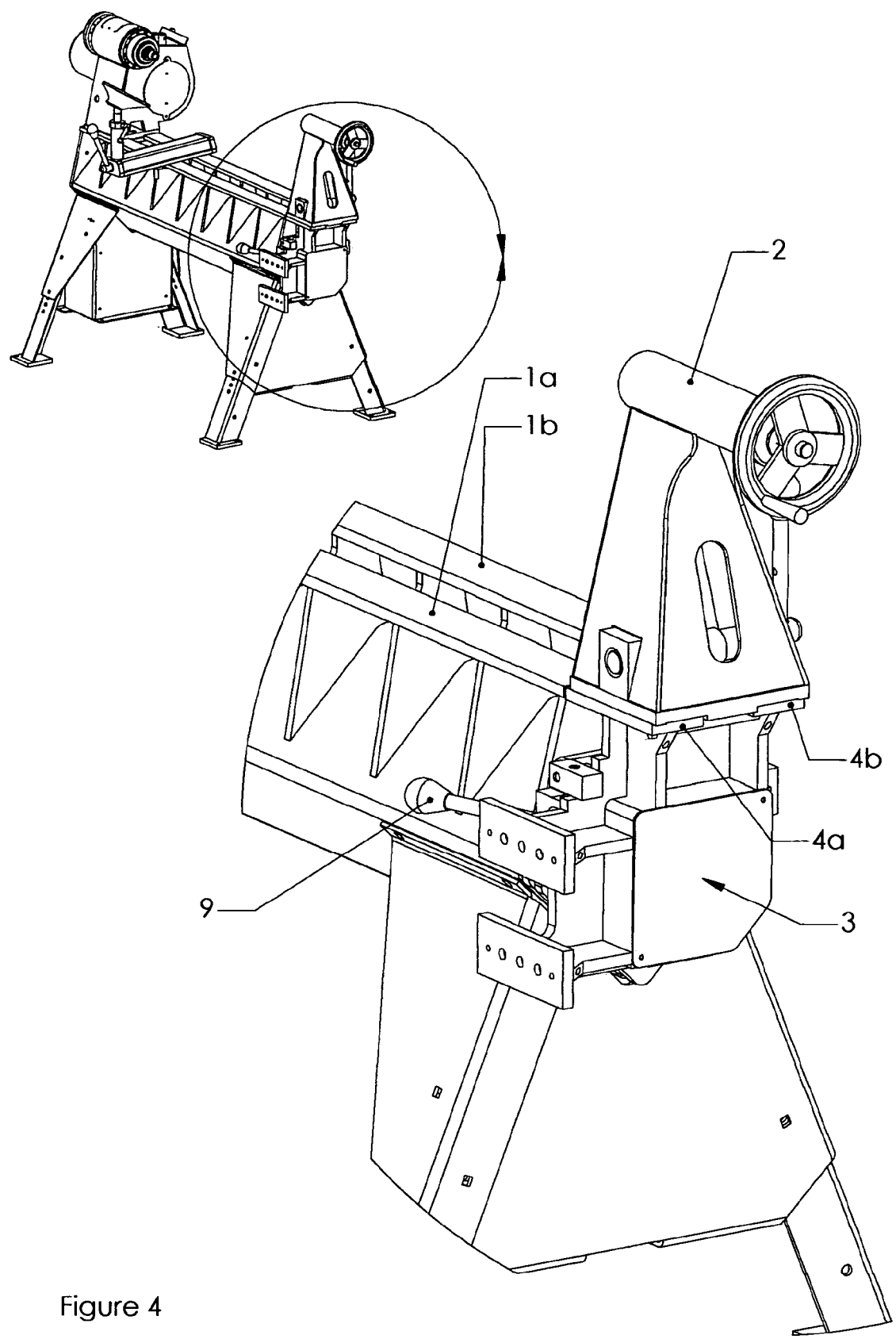
FIG. 4 shows a detail of the conventional woodturning lathe with the tailstock slid onto the invention.
Figure 5:
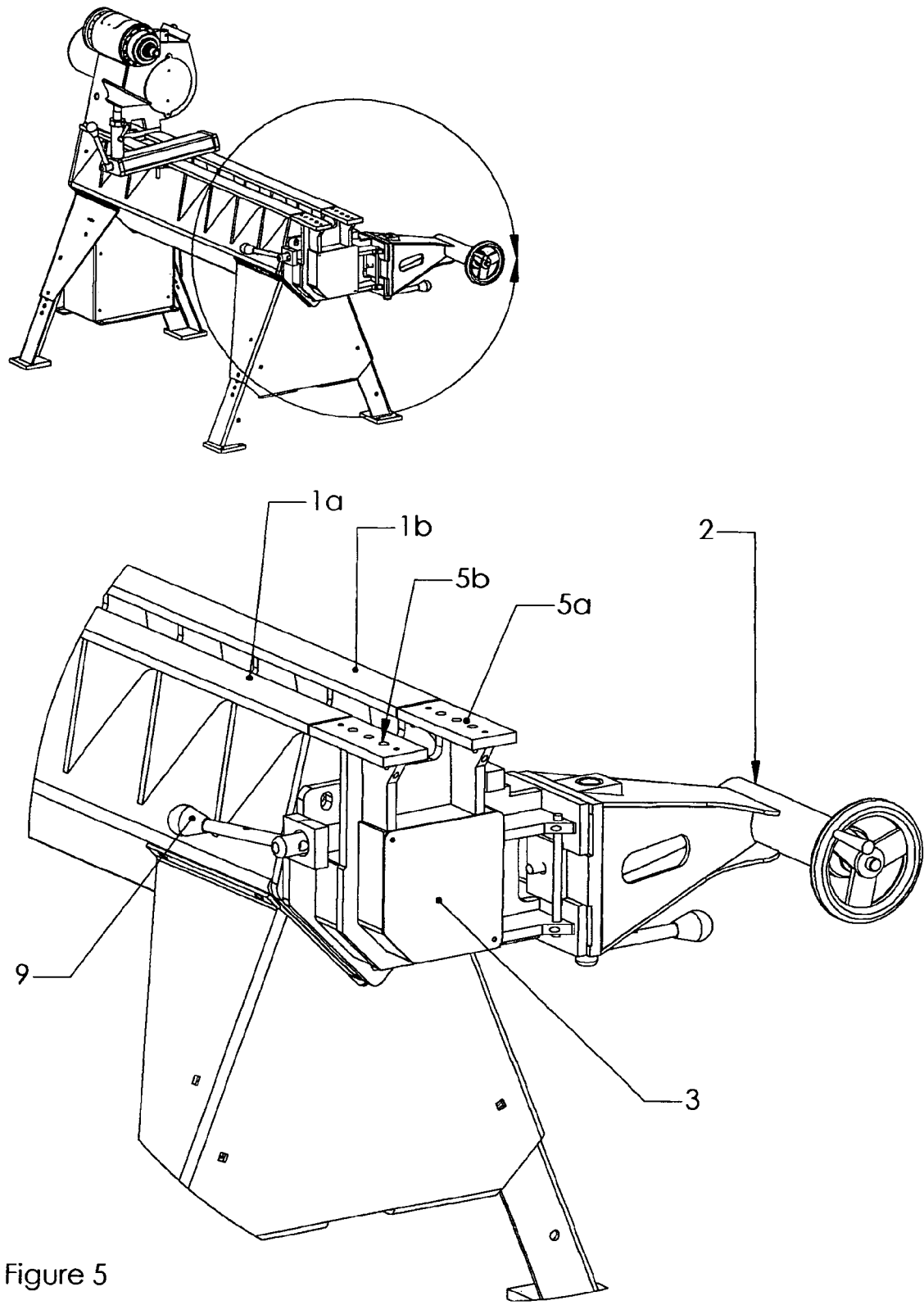
FIG. 5 shows a detail of the conventional woodturning lathe after the invention has been rotated and the tailstock is out of the turners way.

Various figures show a conventional wood turning lathe, and on this particular model the ways 1a, 1b are flat and run the length of the lathe bed. A typical tailstock 2 is shown in its normal position on the lathe ways in FIG. 1, and the invention 3 can be seen at the end of the lathe where it is typically attached with bolts.

The primary set of ways on the invention 4a 4b are aligned with the lathe ways 1a and 1b when the invention is residing in the normal position. They are attached to the rotating plate 7 by standoffs 6. The rotating plate 7 rotates in a vertical plane around a horizontal axis on the pivot 8 which is parallel to the lathe ways 1*a*, 1*b* and parallel to the primary invention ways 4*a*, 4*b* and secondary invention ways 5*a* and 5*b*.

A conventional cam style locking mechanism 14 is activated by handle 9. The rotating plate 7 has a radial slot 11 through which the clamping mechanism 10 secures the rotating plate to the fixed plate 15. Fixed plate 15 is bolted to the end of the lathe through bolts hole like the one at 16. Travel of the rotating plate 7 is limited by the stop block 12 which further serves to assure that the primary invention ways 4*a*, 4*b* and secondary invention ways 5*a*, 5*b* align with the lathe ways 1*a*, 1*b* for smooth operation. A removable stop 13 is provided to keep the tailstock from being slid to far and detaching from the invention.

To operate the invention, tailstock 2 is slid back on to the inventions primary ways 4*a*, 4*b* until it comes to stop 13. Handle 9 is used to loosen the conventional cam style locking mechanism 14 and thus the clamping mechanism 10. The woodturner than grasps the tailstock 2 and tilts it over and out of the way until the stop block 12 comes to rest. Handle 9 is then reset to lock the rotating plate 7 in its new position. The invention's secondary ways 5*a*, 5*b* are then aligned with the lathe ways 1*a*, 1*b*, and can be used to support tool rests, steady rests, the headstock (in the case of sliding headstock style lathes) or other auxiliary components that the woodturner chooses to use. To return the tailstock 2 to its original position, the operation is simply reversed.

The invention offers superior safety and ease of operation combined with versatility and increased capacity when compared with the present art of manually removing and reinstalling the tailstock.

Finally, it is to be understood that various alterations, modifications and/or additions may be incorporated into the various constructions and arrangements or parts without departing from the spirit and ambit of the invention.

I claim:

1. A pivoting lathe bed extension for a conventional lathe comprising of a stationary section and a rotatable section; said stationary section is mechanically connected to a longitudinal end of a lathe bed on a tailstock end of said lathe bed with a pivot shaft extending from said stationary section with its axis parallel to said lathe bed upon which said rotatable section can pivot; said rotatable section is fitted with a hole upon which it can pivotally rotate in a vertical plane about said pivot shaft extending from said stationary section; said rotatable section is further constructed with two sets of ways, primary and secondary, which are parallel to and substantially similar to ways of said lathe bed to which said pivoting lathe bed extension is affixed; the normal planes of said primary and secondary ways are perpendicular to each other and said normal planes of said primary and secondary ways are also equal distance from and parallel to said axis of the hole in which said rotatable section may pivot about said pivot shaft; said rotatable section may be rotated so that either said primary or secondary ways align with said ways on said lathe bed to which said pivoting lathe bed extension is affixed.

2. A pivoting lathe bed extension according to claim 1 of which said rotatable section may be locked into any position in its arc of movement relative to said stationary section using a conventional cam style locking mechanism attached to said fixed section and activated manually by a handle; said rotating section has a radial slot concentric to said pivot hole through which said cam style locking mechanism passes through and secures said rotating section to said fixed section.

3. A pivoting lathe bed extension according to claim 1 which has mechanical stops on said rotating section for limiting the travel of its arc of movement relative to said stationary section and which further provide unique positions wherein said primary and secondary ways affixed to said rotating section may align with said ways of the lathe bed to which said pivoting lathe bed extension is affixed.

4. A pivoting lathe bed extension according to claim 1 in which said rotatable section is spring loaded to facilitate the return of said rotatable section to its original position after being moved.

5. A pivoting lathe bed extension according to claim 1 in which said rotatable section is counter-weighted to facilitate the return of said rotatable section to its original position after being moved.

6. A pivoting lathe bed extension according to claim 1 which is constructed as a unit and can be attached or removed from said lathe bed as a unit.

7. A pivoting lathe bed extension according to claim 1 in which said stationary section is constructed integral with said longitudinal end of said lathe bed.

8. A pivoting lathe bed extension according to claim 1 which is fabricated from plate steel.

9. A pivoting lathe bed extension according to claim 1 which is fabricated from cast iron.

10. A pivoting lathe bed extension according to claim 1, but with said pivot shaft mounted on said rotatable section.

11. A pivoting lathe bed extension according to claim 1, in which said normal plane of said primary and secondary ways on said rotatable section are less then 90 degrees from one another.

12. A pivoting lathe bed extension according to claim 1, in which said normal plane of said primary and secondary ways on said rotatable section are greater then 90 degrees from one another.

13. A pivoting lathe bed extension according to claim 1, in which said fixed section is mechanically connected to said longitudinal end of said lathe bed on the headstock end.

* * * * *